Nov. 13, 1945.    W. M. MOUNT    2,388,796
LIQUID DEMULSIFYING AND SETTLING APPARATUS
Filed Nov. 24, 1941    3 Sheets-Sheet 1

INVENTOR.
Walter M. Mount
BY
Attys.

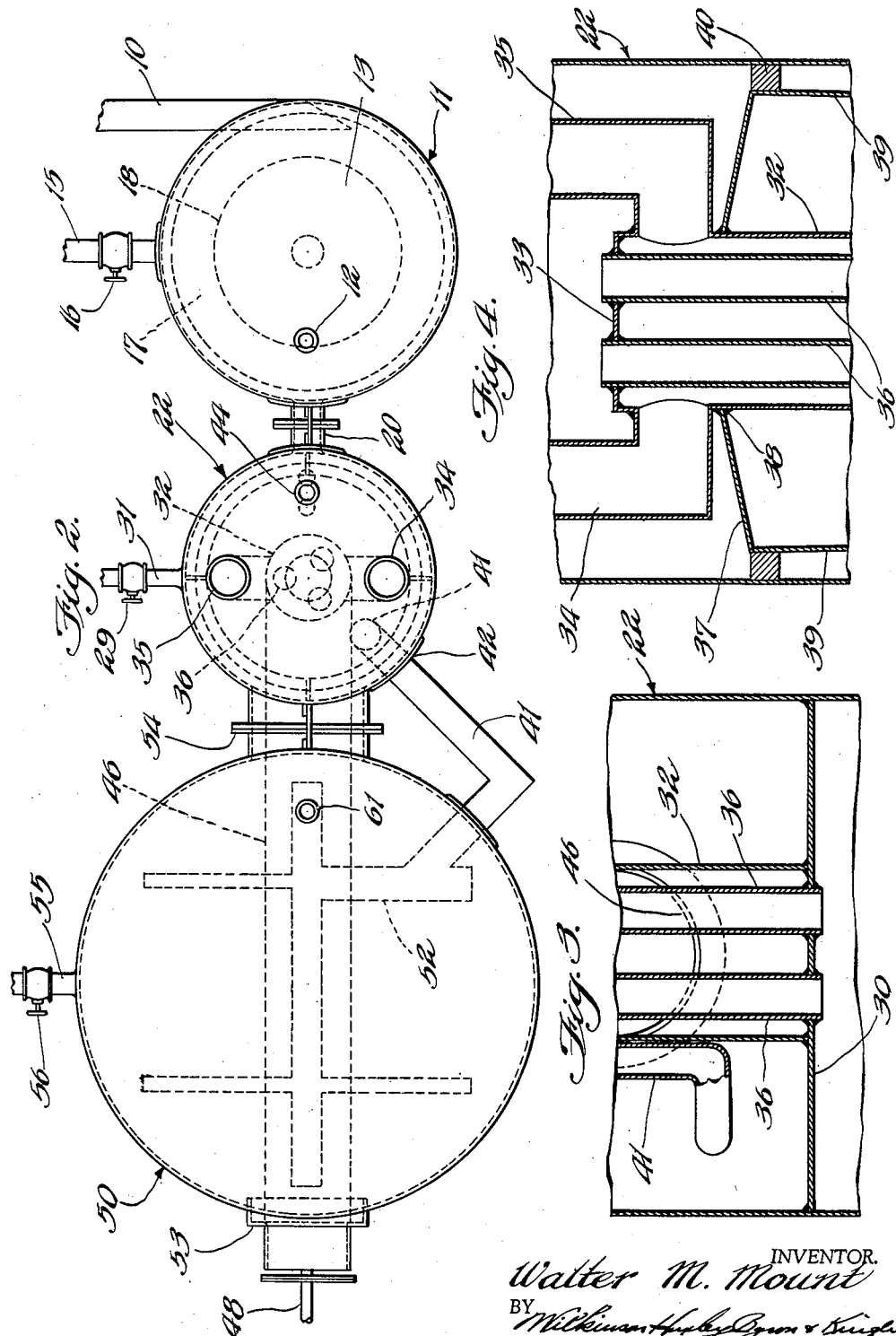

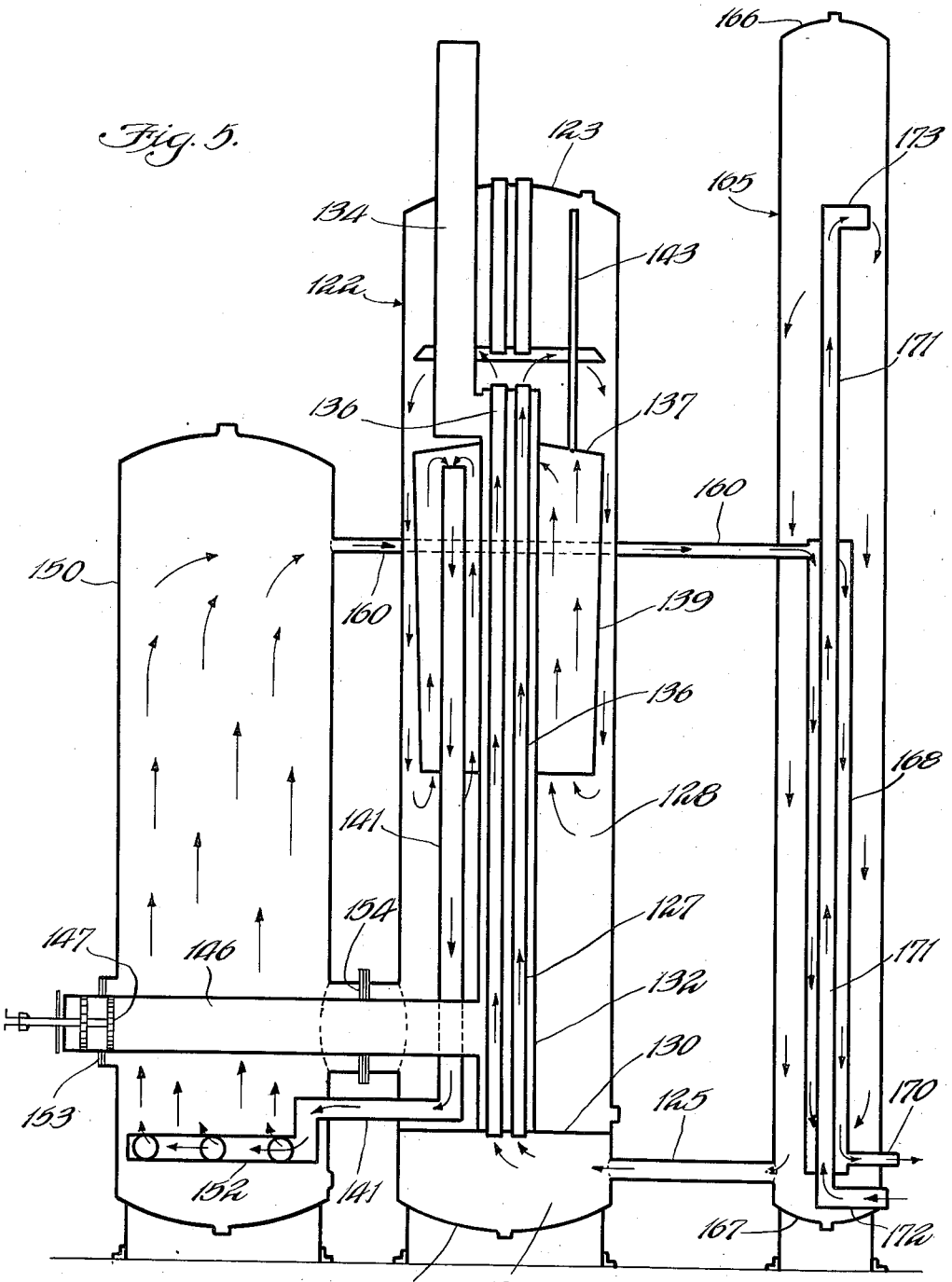

Patented Nov. 13, 1945

2,388,796

UNITED STATES PATENT OFFICE 2,388,796

LIQUID DEMULSIFYING AND SETTLING APPARATUS

Walter M. Mount, Tulsa, Okla.

Application November 24, 1941, Serial No. 420,268

4 Claims. (Cl. 252—362)

The invention relates to apparatus for demulsifying and settling liquids such as crude oil and similar liquids and has reference more particularly to improved apparatus of the type disclosed and claimed in Patent No. 2,326,384, granted August 10, 1943, for Demulsifying and settling tank.

In the treatment of crude oil, for example, to remove excess free water and sediment and for breaking down the water-oil emulsions, the oil is heated and then caused to flow through a clarifying chamber where the liquids of different specific gravity separate from each other with the lighter liquid rising to the top of the clarifying zone and the heavier liquid together with the solids settling to the bottom. Since heat facilitates the clarification and demulsification of the liquids the present invention seeks to obtain an even distribution of the heat throughout the mass of liquid being treated, with the maximum heating taking place during flow of the liquid through the clarifying chamber.

An object of the invention is to provide apparatus of the character described which will make efficient use of the heat added to the liquid for more effectively breaking down the emulsified water and impurities in the liquid, and which will conserve the heat to the greatest possible extent by bringing the relatively cool liquid before treatment into heat exchanging relation with the heated liquid following clarification thereof.

An object of the invention is to provide apparatus of special design for controlling the flow of the liquid through the same so that the liquid will flow at a gradually decreasing velocity from the initial heating stage to the final settling stage.

A further object of the invention is to provide a final settling tank for the clear liquid separate and apart from the clarifying apparatus and of relatively large cross section to diminish the flow of the liquid during this last settling stage and which takes place in an upward direction.

Another object is to provide a final settling tank for the clear liquid located apart from the clarifying apparatus but which will be arranged with respect thereto so that the heating means for the apparatus will extend laterally through the final settling tank to additionally heat the liquid and promote clarification thereof during this final settling stage.

With these and various other objects in view the invention may consist of certain novel features of construction and operation as will be more fully described and particularly pointed out in the specification, drawings and claims appended hereto.

In the drawings which illustrate an embodiment of the invention and wherein like reference characters are used to designate like parts—

Figure 2 is a top plan view of the structure shown in Figure 1 illustrating the tangential inlet for the first tank and the manner of introducing the clear liquid into the final settling tank;

Figure 3 is a fragmentary sectional view showing the bottom construction for the heating chamber located within the clarifying tank;

Figure 4 is a fragmentary sectional view showing the construction at the upper end of the heating chamber and the provision of flues for carrying off the products of combustion; and Figure 5 is a diagrammatic view illustrating another modification of the invention wherein the clarified liquid is used to preheat the raw liquid prior to clarification of the same.

Figure 1:
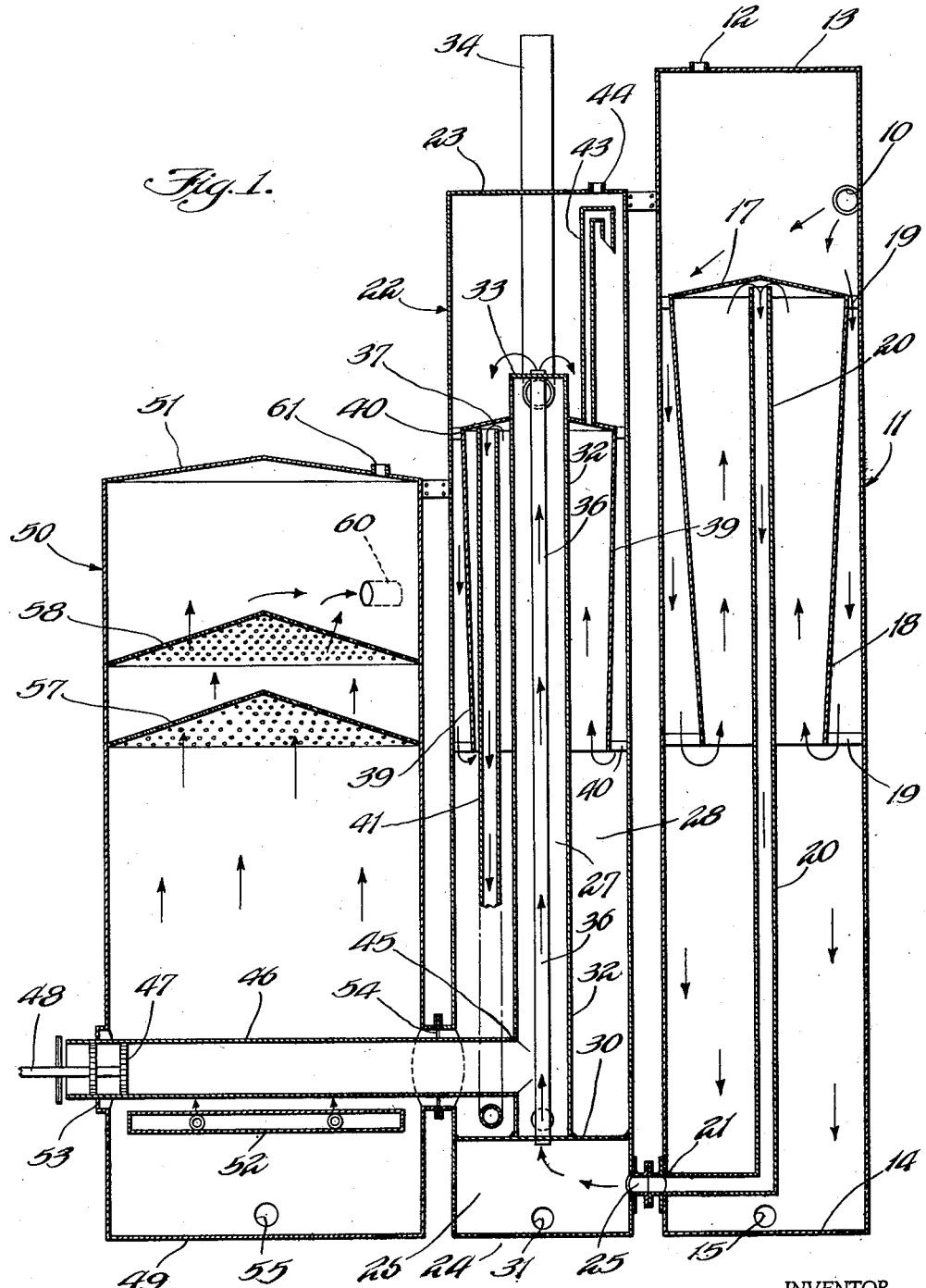
Figure 1 is a vertical sectional view showing an arrangement of three tanks comprising one embodiment of the improved demulsifying and settling apparatus coming within the invention.

Referring to the drawings, particularly Figures 1 to 4 inclusive, the apparatus forming this modification of the invention consists of three separate tanks arranged side by side and wherein the liquid flows from one to the other, finally leaving the last tank as clear liquid from which all emulsions, foreign particles and sludge have been removed. The raw liquid is conducted to the apparatus by the inlet 10 which connects with the first tank 11 in a tangential manner so that the liquid is delivered to said tank 11 at the upper end thereof and caused to swirl with considerable agitation whereby any gas in the liquid separates therefrom, eventually leaving the tank 11 through the gas outlet 12.

Said tank 11 is in the form of a cylindrical member having a top 13 and a bottom 14 with a suitable outlet 15 being provided adjacent the bottom so that the solids, foreign particles and sludge which settle and accumulate within the lower portion of the tank can be drawn off. When the valve 16 is open, fluid from the outlet may be controlled by a siphon, or by a float operated or pressure operated valve. The liquids entering the tank 11 by the inlet 10 are initially discharged above the sloping tray 17 which is provided with a depending flange 18 depending from the periphery thereof. The tray and depending flange comprise a unit which is held within tank 11 by means of supports 19.

The flow of the liquid through tank 11 is indicated by the arrows appearing in Figure 1. It will be observed that the tray and the depending peripheral flange form with the cylindrical wall of said tank an annular discharge passage through which the liquids flow in a downward direction. The flange 18 at its lower end is spaced a greater distance from the cylindrical wall 11 of the tank than the upper portion of the flange where the same connects with the tray 17. This construction provides an annular discharge passage of increasing cross sectional area downwardly and effectively eliminates any stoppage of the flow due to the solids or sediment in the liquid clogging the discharge passage. The clarifying zone comprising the space within the depending peripheral flange and the tray is provided with a somewhat restricted entrance at its lower end compared to the size of the zone in the upper part thereof. This is desirable since the liquids in flowing upwardly within said zone are caused to decrease in velocity due to the fact that the zone increases in cross sectional area. Located centrally within said clarifying zone and extending from directly under the tray 17 is a clear liquid outlet pipe 20, the pipe continuing to the base of the tank 11 where it is directed through the cylindrical wall of the tank as at 21. The liquid in flowing upwardly within the clarifying zone is clarified since a large proportion of the heavy solids carried by the liquid will settle out and accumulate in the bottom of the tank 11. Also the settling out of the solids, sludge and other foreign matter is aided by the fine particles in suspension in the liquid at the entrance to the clarifying zone. There is a tendency for these fine particles to form in layers segregated according to size and density and these layers form an excellent filter for the rising dispersion medium.

The tank 11 with the clarifying apparatus contained therein is provided for removing free water and other foreign substances that can be separated without the application of heat. No heat is added to the liquid and the same is not otherwise treated so that further clarification thereof and demulsification is necessary before a satisfactory clear liquid for most purposes is secured. From tank 11 the clear liquid is admitted to an intermediate clarifying tank 22 of cylindrical form having a top 23, a bottom 24 and an inlet 25 at the base thereof which joins with the portion of the outlet pipe 20 extending from tank 11.

The interior of tank 22 is divided into an inlet chamber located at the base thereof, identified by numeral 26, a heating chamber 27, which extends vertically of the tank, and a clarifying chamber 28 formed by the remaining space within the tank and which is therefore outside of the heating chamber and above the inlet chamber. The partition 30, as better shown in Figure 3, forms the top wall for the inlet chamber, which chamber communicates with the inlet 25 and is also provided with an outlet 31. The partition 30 also forms the base support for the cylindrical wall 32 comprising the heating chamber which extends vertically within tank 22, being closed in the upper portion of the tank by the top wall 33, Figure 4. Immediately below the said top wall the cylindrical wall 32 is provided with laterally extending flues 34 and 35 which extend upwardly to pass out of the clarifying chamber through the top wall 23 of the tank and therefore conduct the products of combustion from the heating chamber to the atmosphere. The heating chamber is completed by a plurality of liquid carrying pipes 36. The pipes at their lower ends extend through the partition 30 to thereby communicate with the inlet chamber 26. At their upper end the pipes project through and beyond the top wall 33 and in so doing function to discharge the liquid flowing through the same into the clarifying chamber.

In this embodiment of the invention the clarifying chamber is provided with a single tray having a peripheral depending flange united thereto in a manner to form a unit and which functions to clarify the liquid in much the same manner as the tray and depending flange function within the first tank 11. Within the clarifying chamber 28, however, the tray 37 has surrounding relation with the walls 32 of the heating unit. As better shown in Figure 4, the tray 37 is secured as by welding 38 to the cylindrical wall 32 of the heating unit, and which unit is thereby disposed centrally of the tray and concentrically with respect to the peripheral depending flange 39. The clarifying unit comprising the tray 37 and flange 39 are suitably secured to the wall 22 of the tank by means of the supports 40. Said unit forms an annular discharge passage with the cylindrical wall of tank 22 and which is of increasing cross sectional area in a downward direction. The space within the flange provides a clarifying zone which increases in cross sectional area in an upward direction. The liquid from pipes 36 is discharged into the clarifying chamber above the tray 37 and said liquid flows downwardly through the annular discharge passage, whereupon its direction of flow is reversed for the liquid to enter the clarifying zone. As a result of the particular design of the unit the velocity of flow of the liquid tends to decrease in the discharge passage as well as in the clarifying zone.

The solids, sludge and other heavy particles in the liquid travel downwardly due to gravity and eventually settle out and accumulate in the base of tank 22. The major portion of the liquid being treated flows upwardly within the clarifying zone and the same is intensely clarified as a result of the suspension of fine particles at the entrance to the clarifying zone. As the upward flow gradually diminishes the finer particles tend to rise to a point where their upward travel is just counter-balanced by their tendency to fall. These particles, therefore, tend to form in layers according to size and density and the same form an excellent filter for the rising dispersion medium. Larger particles are thus formed as the fine particles tend to agglomerate and these larger particles eventually settle out and form the sludge which collects in the bottom of the tank. The clarified liquid upon reaching the upper portion of the clarifying zone flows into the upright outlet pipe 41. One or more outlet pipes may be provided, each extending within the clarifying zone and having their open end located immediately below the tray 37. The pipes conduct the liquid from said zone and extend through tank 22 as at 42, Figure 2. Any gases which may accumulate in the upper portion of the clarifying zone are conducted by the vent pipe 43 to within the clarifying chamber. From said chamber the gases are conducted to the outlet 44 and in the demulsification and clarification of oil it is to be found that these gases are combustible and accordingly they can be used to help fire the heating chamber.

In this intermediate tank heat is added to the liquid in order to facilitate the clarification of the same. During upward flow of the liquid through pipes 36 heat is continually added thereto since the cylindrical wall 32 has connection at 45 with the fire tube 46. Said fire tube comprises a cylindrical conduit within the open end of which is located the gas or oil burner 47 having connection with a gas or oil supply main 48. The gases or oil are supplied by main 48 and are ignited at the burner 47 and said gases or oil burn within the fire tube 46 and within the heating unit. The heat added to the liquid is a maximum at the base of the heating unit since the gases tend to become cooler as they travel upwardly toward the flues 34 and 35. The liquid on the other hand is at a maximum temperature upon discharge in the upper portion of the clarifying chamber and heat is dissipated thereby as it flows downwardly. Since this flow takes place in surrounding relation with the heating chamber sufficient heat is added thereto during its down-flow to approximately make up for the heat dissipated and thus the mass of liquid within the chamber is maintained at a comparatively even temperature.

The outlet pipe 41 passes out of chamber 22 at an angle with respect to the fire tube 46, as clearly evident by Figure 2. In accordance with the invention the clarified liquid from said outlet pipe is delivered to a settling tank identified in its entirety by numeral 50, having a base 49 and a top 51, and which is positioned adjacent the intermediate tank 22, although the same is separate and apart therefrom. Outlet pipe 41 enters the tank 50 at the base thereof and the liquid is discharged within the settling tank by means of a hollow member 52 in the form of a double cross which extends substantially over the entire area of the base and is perforated at a plurality of places to discharge the liquid therefrom. Member 52 is located below the fire tube 46 which, as shown in Figure 1, extends diametrically through the settling tank 50. The tank is sealed at the entrance end of the tube by means of the flange 53 and at its exit end a similar seal is provided by the flange 54. The liquid upon leaving member 52 is again subjected to a heating element in the form of the fire tube 46 and additional heat is thus added to the liquid. Since the liquid flows upwardly within the settling tank 50 the heating of the same in combination with this upward flow helps to further clarify the liquid and any foreign particles, emulsified water and impurities carried by the liquid are caused to settle out and collect in the base of tank 50. The sludge formed thereby is drawn off from the tank through the outlet 55 provided with the valve 56. Perforated baffles 57 and 58 located in the upper portion of tank 50 also aid in promoting clarification of the liquid since the liquid is required to flow through the relatively small openings in said baffles. In so doing any emulsions remaining in the liquid are mechanically broken down and any gases which may also remain in the liquid will be released thereby for collection within the upper portion of the tank. The clear liquid flows from tank 50 through the outlet 60 located above the top baffle 58 and the gas within the upper portion of the tank is vented through the vent 61.

Figure 5 is a diagrammatic view in the form of a flow diagram showing another modification of the invention wherein the clarified and heated liquid from the final settling tank is used to preheat the raw liquid prior to treatment thereof. The intermediate tank 122 contains clarifying apparatus similar in construction and in operation to that located within tank 22 of the structure shown in Figure 1. The cylindrical tank has a top 123, a bottom 124 and an inlet 125 which delivers liquid to be clarified to the inlet chamber 126. In addition to the inlet chamber the intermediate tank is provided with a heating chamber 127 and a clarifying chamber 128 formed by the remaining space within the tank and which is therefore outside the heating chamber and above the inlet chamber. The partition 130 forms the base support for the cylindrical wall 132 comprising the heating chamber and which extends vertically within the tank, terminating in the laterally extending flue 134. The liquid carrying pipes 136 extend through the partition 130 at their lower end to communicate with the inlet chamber and at their upper end project through and beyond the top wall of the heating chamber so as to discharge the liquid flowing through the same into the clarifying chamber.

The clarifying means within the clarifying chamber comprises the tray 137 having surrounding relation with the walls 132 of the heating unit and which tray is provided with a depending flange 139 to form the clarifying unit. Said unit provides an annular discharge passage which increases in cross sectional area in a downward direction and the clarifying zone within the flange increases in an upward direction. The clear liquid from the clarifying zone is drawn off by the vertically disposed outlet pipe 141. The outlet pipe enters the base of the final settling tank 150 through which the fire tube 146 extends substantially diametrically so as to enter the intermediate tank for connection with the heating chamber thereof. The operation of said fire tube including burner 147 is substantially similar to the modification shown in Figure 1 since it will be observed that the entering end of the fire tube is sealed with respect to tank 150 by flange 153 and the exit end where the tube leaves tank 150 and enters the intermediate tank the same is sealed by the flange 154.

The heated and clarified liquid from outlet 141 is delivered to the final settling tank by member 152 located in the bottom thereof and having a plurality of openings for discharging the liquid below the fire tube 146. In flowing upwardly within the final settling tank the liquid is further heated by the heat given off by fire tube 146. This upward flow within the final settling tank together with the additional heating of the liquid further aids in clarification of the same since any water, foreign particles, solids and the like still remaining in the liquid will be caused to settle out.

In this modification of the invention the liquid leaving the final settling tank and which contains considerable heat is used to heat the raw liquid in a third tank of elongated cylindrical form and which may be located in proximity to the settling tank and to the intermediate clarifying tank. Accordingly the outlet 160 for withdrawing the clear liquid from the final settling tank has connection with tank 165 having a domed top 166 and bottom 167. The interior of the tank is equipped with two pipes or conduits for bringing the hot clear liquid into heat exchanging relation with the raw liquid. The outer enclosing conduit 168 has connection at its upper end with the inlet 160 and the outlet 170 for said conduit extends through the wall of tank 165 in the base thereof. Conduit 168 has surrounding relation and is concentric with an interior pipe 171 having an inlet 172 located in the base portion of the tank and the pipe 171 extends vertically through conduit 168 to project beyond the upper end of the same where pipe 171 is provided with an outlet 173 discharging within tank 165.

In the operation of the heat exchanging tank as disclosed in the modification of Figure 5 the raw liquid enters at 172 and flows upwardly within pipe 171 where the same is in heat exchanging relation with the hot clear liquid flowing downwardly within the outer conduit 168. Eventually the raw liquid is discharged at 173 within the tank and here again as a result of the downward flow of the liquid within the tank the same is brought into heat exchanging relation with the hot clear liquid in conduit 168. The preheated liquid leaves tank 165 by conduit 125 which also serves as inlet for the intermediate tank 122 and from there on the liquid is subjected to clarification as previously described in connection with the apparatus of Figure 1.

The invention is not to be limited to or by details of construction of the particular embodiment thereof illustrated in the drawings, as various forms of the device will of course be apparent to those skilled in the art without departing from the spirit of the invention or the scope of the claims.

What is claimed is:

1. Apparatus for demulsifying and settling liquids, in combination, a clarifying tank having an inlet in the base thereof for liquid to be treated, a heating chamber extending vertically within the tank for heating the liquid during upward flow through the chamber from said base inlet to an outlet in the upper end of the chamber, clarifying means also located within the tank in surrounding relation with the heating chamber and having location below the outlet for the heated liquid whereby the liquid flows downwardly in the tank around the clarifying means, said clarifying means clarifying the liquid by reversing the downward liquid flow within the tank to establish a zone of upward flow, a conduit for conducting the clear liquid from said clarifying means, a settling tank, said conduit connecting with the settling tank at the base thereof and delivering the liquid to said settling tank, a fire tube extending transversely through the settling tank and into the clarifying tank for connection with the heating chamber therein, and an outlet for withdrawing the liquid from the settling tank.

2. Apparatus for demulsifying and settling liquids, in combination, a clarifying tank having an inlet in the base thereof for liquid to be treated, a heating chamber extending vertically within the tank for heating the liquid during upward flow through the chamber from said base inlet to an outlet in the upper end of the chamber, clarifying means also located within the tank in surrounding relation with the heating chamber and having location below the outlet for the heated liquid whereby the liquid flows downwardly in the tank around the clarifying means, said clarifying means clarifying the liquid by reversing the downward liquid flow within the tank to establish a zone of upward flow, a conduit for conducting the clear liquid from said clarifying means, a settling tank, said conduit delivering the liquid to said settling tank, a discharge member in the base of the settling tank having connection with said conduit, a fire tube extending substantially diametrically through the settling tank and into the clarifying tank for connection with the heating chamber therein, the portion of the fire tube within the settling tank being disposed above the discharge member, and an outlet in the upper portion of the settling tank for conducting the clear liquid from said tank.

3. Apparatus for clarifying liquids, in combination, a clarifying tank and a settling tank having an upright position adjacent each other, a heating unit in the clarifying tank for heating the liquid during upward flow of the unit from a base inlet to an outlet in the upper end thereof, clarifying means having surrounding relation with the heating unit and being located below the outlet for the heated liquid whereby the liquid flows downwardly in the tank around the clarifying means, said clarifying means clarifying the liquid by reversing the downward liquid flow within the tank to establish a zone of upward flow, an outlet for the clear liquid connecting with the settling tank adjacent the base of said tank, a fire tube extending through the settling tank and into the clarifying tank for connection with the heating unit, whereby the clear liquid within the settling tank is additionally heated, said settling tank having an outlet pipe for drawing off the clear liquid, a heat exchanging tank for bringing the clear liquid flowing through the outlet pipe into heat exchanging relation with the raw liquid prior to delivering the same to the clarifying tank, and an inlet pipe for the clarifying tank having connection with said heat exchanging tank.

4. Apparatus for clarifying liquids, in combination a clarifying tank, a settling tank and a heat exchanging tank having an upright position adjacent each other, a heating unit in the clarifying tank for heating the liquid during upward flow of the unit from a base inlet to an outlet in the upper end thereof, clarifying means having surrounding relation with the heating unit and being located below the outlet for the heated liquid whereby the liquid flows downwardly in the tank around the clarifying means, said clarifying means clarifying the liquid by reversing the downward liquid flow within the clarifying tank to establish a zone of upward flow, an outlet for the clear liquid connecting with the settling tank, a fire tube extending through the settling tank transversely thereof and into the clarifying tank for connection with the heating unit, an outlet pipe for drawing off the clear liquid from the settling tank, said outlet pipe connecting with the heat exchanging tank, means in said last mentioned tank for bringing the clear liquid from the outlet pipe into heat exchanging relation with the raw liquid prior to delivering the same to the clarifying tank, and an inlet pipe for the clarifying tank having connection with said heat exchanging tank.

WALTER M. MOUNT.